(12) United States Patent
Nakajima

(10) Patent No.: US 10,306,306 B2
(45) Date of Patent: May 28, 2019

(54) COMMUNICATION DEVICE AND COMMUNICATION METHOD TO PROCESS IMAGES

(71) Applicant: SONY CORPORATION, Tokyo (JP)

(72) Inventor: Yasuhisa Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 19 days.

(21) Appl. No.: 15/308,149

(22) PCT Filed: Feb. 16, 2015

(86) PCT No.: PCT/JP2015/054058
§ 371 (c)(1),
(2) Date: Nov. 1, 2016

(87) PCT Pub. No.: WO2015/174109
PCT Pub. Date: Nov. 19, 2015

(65) Prior Publication Data
US 2017/0064385 A1    Mar. 2, 2017

(30) Foreign Application Priority Data
May 12, 2014    (JP) .................................. 2014-099104

(51) Int. Cl.
*H04N 7/025* (2006.01)
*H04N 21/4402* (2011.01)
(Continued)

(52) U.S. Cl.
CPC ........... *H04N 21/4402* (2013.01); *G09G 5/00* (2013.01); *G09G 5/006* (2013.01); *G09G 5/008* (2013.01);
(Continued)

(58) Field of Classification Search
CPC ............. H04N 21/25825; H04N 21/43; H04N 21/431; H04N 21/4312; H04N 21/4348;
(Continued)

(56) References Cited

U.S. PATENT DOCUMENTS

| 4,855,650 A * | 8/1989 | Seigneur .................. H04N 5/20 315/383 |
| 7,937,382 B2 * | 5/2011 | Soldan .............. G06F 17/30029 707/705 |

(Continued)

FOREIGN PATENT DOCUMENTS

| JP | 2006-211095 A | 8/2006 |
| JP | 2010-135957 A | 6/2010 |
| JP | 2012-138757 A | 7/2012 |

*Primary Examiner* — Pankaj Kumar
*Assistant Examiner* — Timothy R Newlin
(74) *Attorney, Agent, or Firm* — Chip Law Group

(57) ABSTRACT

Graphics are preferably superimposed on uncompressed image data received from an external device to be transmitted to another external device. An AV amplifier 12 inserted on an HDMI transmission path between a BD player 11 and a television receiver 13 superimposes the graphics on the transmitted uncompressed image data. At that time, the AV amplifier 12 receives dynamic range conversion definition information of the uncompressed image data and generates graphics image data on the basis of the dynamic range conversion definition information to superimpose, thereby displaying the graphics with desired luminance even when dynamic range reverse conversion is performed by the television receiver 13.

10 Claims, 13 Drawing Sheets

(51) Int. Cl.
    *H04N 21/435*     (2011.01)
    *H04N 21/4363*    (2011.01)
    *H04N 21/439*     (2011.01)
    *G09G 5/00*       (2006.01)
    *H04N 5/20*       (2006.01)
    *H04N 5/445*      (2011.01)
    *H04N 5/765*      (2006.01)
    *H04N 21/426*     (2011.01)

(52) U.S. Cl.
    CPC ............... *H04N 5/20* (2013.01); *H04N 5/445* (2013.01); *H04N 5/765* (2013.01); *H04N 21/435* (2013.01); *H04N 21/4398* (2013.01); *H04N 21/43635* (2013.01); *G09G 2340/02* (2013.01); *G09G 2370/042* (2013.01); *G09G 2370/047* (2013.01); *G09G 2370/10* (2013.01); *G09G 2370/12* (2013.01); *H04N 21/42653* (2013.01)

(58) Field of Classification Search
    CPC ........... H04N 21/4355; H04N 21/4356; H04N 21/4402; H04N 21/440227
    See application file for complete search history.

(56) References Cited

U.S. PATENT DOCUMENTS

| | | | | |
|---|---|---|---|---|
| 8,902,247 | B2* | 12/2014 | Min | H04N 1/6008 345/589 |
| 2005/0062890 | A1* | 3/2005 | Yoshida | H03M 1/187 348/572 |
| 2007/0104387 | A1* | 5/2007 | Han | G06T 5/009 382/271 |
| 2008/0235566 | A1* | 9/2008 | Carlson | G06F 17/30781 715/205 |
| 2009/0290807 | A1* | 11/2009 | Marchesotti | H04N 5/57 382/261 |
| 2010/0054128 | A1* | 3/2010 | O'Hern | H04L 67/36 370/235 |
| 2011/0249135 | A1* | 10/2011 | Minato | H04N 5/23232 348/222.1 |
| 2012/0019722 | A1* | 1/2012 | Kwisthout | H04N 5/445 348/564 |
| 2012/0134551 | A1* | 5/2012 | Wallace | H04N 21/234327 382/128 |
| 2014/0040498 | A1* | 2/2014 | Oyman | H04W 24/02 709/231 |
| 2015/0208024 | A1* | 7/2015 | Takahashi | H04N 21/431 386/353 |
| 2015/0208102 | A1* | 7/2015 | Takahashi | H04N 21/4854 348/441 |
| 2015/0245004 | A1* | 8/2015 | Guo | H04N 5/46 348/453 |
| 2015/0245050 | A1* | 8/2015 | Tourapis | H04N 21/42202 375/240.02 |
| 2015/0245096 | A1* | 8/2015 | Mertens | H04N 21/2541 725/31 |
| 2016/0173811 | A1* | 6/2016 | Oh | H04N 19/70 725/116 |
| 2016/0191929 | A1* | 6/2016 | Hwang | H04N 19/30 725/110 |
| 2016/0241829 | A1* | 8/2016 | Qu | G09G 5/006 |
| 2016/0301959 | A1* | 10/2016 | Oh | H04N 21/234327 |
| 2016/0345040 | A1* | 11/2016 | Oh | H04N 21/2343 |

\* cited by examiner

FIG. 2

| knee_function_info(payloadSize){ | Descriptor |
|---|---|
| 201 — knee_function_id | ue(v) |
| 202 — knee_function_cancel_flag | u(1) |
| if(!knee_function_cancel_flag){ | |
| 203 — knee_function_persistence_flag | u(1) |
| 204 — mapping_flag | u(1) |
| 205 — input_d_range | u(32) |
| 206 — input_disp_luminance | u(32) |
| 207 — output_d_range | u(32) |
| 208 — output_disp_luminance | u(32) |
| 209 — num_knee_points_minus1 | ue(v) |
| 210 — for(i=0; i<=num_knee_points_minus1; i++){ | |
| 211 —   input_knee_point[i] | u(10) |
| 212 —   output_knee_point[i] | u(10) |
| } | |
| } | |
| } | |

knee_function_info SEI 200

FIG. 7

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1···3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI_Dual |
| 7 | Max_TMDS_Clock | | | | | | | |
| 8 | Reserved (0) | | | Knee Extension | CNC3 | CNC2 | CNC1 | CNC0 |
| 9 | DRIF | VSIF | HEC | | Reserved (0) | | | |
| 10 | Knee_Point_Number (i) | | | | | | | |
| 11···N | Reserved (0) | | | | | | | |

Vendor Specific Data Block 700

FIG. 8

| Byte# | 7 | 6 | 5 | 4 | 3 | 2 | 1 | 0 |
|---|---|---|---|---|---|---|---|---|
| 0 | Packet Type (0x81) | | | | | | | |
| 1 | CB | Version (0x02) | | | | | | |
| 2 | 0 | 0 | 0 | Length (0x17) | | | | |
| 3 | Check Sum | | | | | | | |
| 4···6 | IEEE Registration Identifier (0xoooC03) | | | | | | | |
| 7 | Reserved (0) | | | | HDR_flag | | Reserved (0) | |
| 8···11 | input_d_range | | | | | | | |
| 12···15 | input_disp_luminance | | | | | | | |
| 16···19 | output_d_range | | | | | | | |
| 20···23 | Reserved (0) | | | | | | | |

Vendor Specific InfoFrame800

FIG. 9

| Byte# | 7 | 6 | 5 | 4 | 3 | 2 | 1 | 0 |
|---|---|---|---|---|---|---|---|---|
| 0 | Packet Type (0x81) ||||||||
| 1 | Version (0x01) ||||||||
| 2 | 0 | 0 | 0 | Length (6+3*i) |||||
| 3 | Check Sum ||||||||
| 4···6 | IEEE Registration Identifier (0xo00C03) ||||||||
| 7 | Reserved (0) ||| HDR_flag | Reserved (0) ||||
| 8 | knee_poinit_Number (i) ||||||||
| 9···11 | input_knee_point[1], output_knee_point[1] ||||||||
| 12···15 | input_knee_point[2], output_knee_point[2] ||||||||
| ···· | ···· ||||||||
| 6+3*i···9+3*i | input_knee_point[j], output_knee_point[j] ||||||||

Vendor Specific InfoFrame900

FIG. 10

| Byte# | 7 | 6 | 5 | 4 | 3 | 2 | 1 | 0 |
|---|---|---|---|---|---|---|---|---|
| 0 | | | | Packet Type (0x83) | | | | |
| 1 | | | | Version (0x01) | | | | |
| 2 | | | | Length (18+3*i) | | | | |
| 3 | | | | Check Sum | | | | |
| 4 | CF | PF | | | Reserved (0) | | | |
| 5...8 | | | | input_d_range | | | | |
| 9...12 | | | | input_disp_luminance | | | | |
| 13...16 | | | | output_d_range | | | | |
| 17...20 | | | | output_disp_luminance | | | | |
| 21 | | | | knee_point_Number (i) | | | | |
| 22...24 | | | | input_knee_point[1], output_knee_point[1] | | | | |
| 25...27 | | | | input_knee_point[2], output_knee_point[2] | | | | |
| ... | | | | ... | | | | |
| 19+3*i...21+3*i | | | | input_knee_point[j], output_knee_point[j] | | | | |

Dynamic Range InfoFrame 1000

*FIG. 11B*

| knee_function_info(payloadSize){ | Descriptor |
|---|---|
| knee_function_id | ue(v) |
| knee_function_cancel_flag | u(1) |
| if(!knee_function_cancel_flag){ | |
| knee_function_persistence_flag | u(1) |
| mapping_flag | u(1) |
| input_d_range | u(32) |
| input_disp_luminance | u(32) |
| output_d_range | u(32) |
| output_disp_luminance | u(32) |
| num_knee_points_minus1 | ue(v) |
| for(i=0; i<=num_knee_points_minus1; i++){ | |
| input_knee_point[i] | u(10) |
| output_knee_point[i] | u(10) |
| } | |
| } | |
| } | |

1130

COMMUNICATION DEVICE AND COMMUNICATION METHOD TO PROCESS IMAGES

CROSS REFERENCE TO RELATED APPLICATIONS

This application is a U.S. National Phase of International Patent Application No. PCT/JP2015/054058 filed on Feb. 16, 2015, which claims priority benefit of Japanese Patent Application No. JP 2014-099104 filed in the Japan Patent Office on May 12, 2014. Each of the above-referenced applications is hereby incorporated herein by reference in its entirety.

TECHNICAL FIELD

The technology disclosed in this specification relates to a communication device, a communication method, and a computer program for transmitting/receiving data, and relates, for example, to the communication device, the communication method, and the computer program for transmitting/receiving uncompressed image data transmitted by a digital interface such as HDMI.

BACKGROUND ART

Recently, High Definition Multimedia Interface (HDMI)™ has become popular as a communication interface which transmits an uncompressed (baseband) image signal (image data) and a digital audio signal (audio data) accompanying with the image signal at a high speed. An HDMI source device on a data transmission side is connected to an HDMI sink device on a data reception side through the HDMI interface. For example, there may be an AV system in which a Blu-ray disc (BD) recorder, a set top box (STB), and another audio visual (AV) source as the HDMI source device and a television receiver, a projector, and another display as the HDMI sink device are connected to each other through the HDMI interface.

A system configuration in which an HDMI repeater provided with an HDMI input and an HDMI output is interposed between the HDMI source device and the HDMI sink device is also known (for example, refer to Patent Documents 1 and 2).

The HDMI repeater device may perform processing of superimposing graphics such as a menu operated by a user on the uncompressed image data which is input by HDMI in addition to characteristic correction of a transmission signal such as wavelength equalization. At that time, it is considered to be general that the HDMI repeater controls a dynamic range of a graphics generating unit on the premise of viewing with a monitor of standard luminance (100 cd/m$^2$).

The uncompressed image data output from the HDMI source device might be transmitted after an original image having a standard or higher luminance dynamic range is subjected to dynamic range conversion to be compressed to have the standard luminance dynamic range.

Also, recently, with development in display technology, a display device such as an organic electro-luminescence display and a liquid crystal display (LCD) which may display an image brighter than the standard luminance of approximately 1000 cd/m$^2$, for example, is commercially available. When the HDMI sink device is the display device having such a wide dynamic range, the image display to make use of its capability becomes possible by performing dynamic range reverse conversion on the image data on which the dynamic range conversion is performed on the HDMI source device side to return the same to the image data having original high luminance dynamic range.

However, when an graphics image having the standard luminance dynamic range is superimposed by the HDMI repeater interposed between the HDMI source device and the HDMI sink device, there might be a case in which the dynamic range of the graphics image displayed on the monitor excesses that supposed when the dynamic range reverse conversion is performed on the HDMI sink device.

SUMMARY OF THE INVENTION

Problems to be Solved by the Invention

An object of the technology disclosed in this specification is to provide excellent communication device, communication method, and computer program capable of preferably superimposing the graphics on the uncompressed image data received from an external device to transmit to another external device.

Solutions to Problems

The present application is achieved in consideration of the above-described problem, and technology recited in claim 1 is a communication device including:

a data receiving unit which receives uncompressed image data transmitted from a first external device through a first transmission path;

an information receiving unit which receives dynamic range conversion definition information of the uncompressed image data through the first transmission path;

a graphics processor which adjusts luminance of graphics on the basis of the dynamic range conversion definition information received by the information receiving unit to combine with the uncompressed image data received by the data receiving unit; and a data transmitting unit which transmits the uncompressed image data with which the graphics are combined to a second external device.

According to the technology recited in claim 2 of the present application, the information receiving unit of the communication device according to claim 1 is configured to receive the dynamic range conversion definition information of the uncompressed image data inserted into a blanking period of the uncompressed image data received by the data receiving unit from the first external device.

According to the technology recited in claim 3 of the present application, the information receiving unit of the communication device according to claim 1 is configured to receive the dynamic range conversion definition information of the uncompressed image data through a bi-directional communication path formed of a predetermined line of the first transmission path.

According to the technology recited in claim 4 of the present application, the data transmitting unit of the communication device according to any one of claims 1 to 3 is configured to transmit the uncompressed image data with which the graphics are combined to the second external device through a second transmission path.

According to the technology recited in claim 5 of the present application, in the communication device according to any one of claims 1 to 4, the predetermined line of the first transmission path is formed of a pair of differential transmission paths and at least one of the pair of differential transmission paths has a function of notifying of a connection status of the external device.

According to the technology recited in claim 6 of the present application, the information receiving unit of the communication device according to claim 4 is configured to receive a control packet in which the dynamic range conversion definition information is stored from the first external device according to transmission system information received from the second external device through the second transmission path.

According to the technology recited in claim 7 of the present application, the information receiving unit according to claim 4 is configured to receive related information of the dynamic range conversion definition information which the second external device supports through a predetermined line of the second transmission path, and the graphics processor is configured to execute processing of the graphics on the uncompressed image data received by the data receiving unit on the basis of the received related information.

According to the technology recited in claim 8 of the present application, in the communication device according to claim 7, the predetermined line of the second transmission path is formed of a pair of differential transmission paths and at least one of the pair of differential transmission paths has a function of notifying of a connection status of the external device.

Also, technology recited in claim 9 of the present application is a communication method including:

a step of receiving transmission system information of dynamic range conversion definition information from a second external device through a second transmission path;

a step of receiving the dynamic range conversion definition information from a first external device on the basis of the transmission system information through a first transmission path;

a step of adjusting luminance of graphics on the basis of the dynamic range conversion definition information and combining the graphics with uncompressed image data transmitted from the first external device through the first transmission path; and a step of transmitting the uncompressed image data with which the graphics are combined to the second external device through the second transmission path.

Also, technology recited in claim 10 of the present application is a computer program described in a computer readable format for allowing a computer to serve as:

a data receiving unit which receives uncompressed image data transmitted from a first external device through a first transmission path;

an information receiving unit which receives dynamic range conversion definition information of the uncompressed image data through the first transmission path;

a graphics processor which adjusts luminance of graphics on the basis of the dynamic range conversion definition information received by the information receiving unit to combine with the uncompressed image data received by the data receiving unit; and a data transmitting unit which transmits the uncompressed image data with which the graphics are combined to a second external device.

The computer program according to claim 10 of the present application is obtained by defining the computer program described in a computer readable format so as to realize predetermined processing on the computer. In other words, by installing the computer program according to claim 10 of the present application on the computer, a cooperative effect is exerted on the computer and a function effect similar to that of the communication device according to claim 1 of the present application may be obtained.

Effects of the Invention

According to the technology disclosed in this specification, it is possible to provide the excellent communication device, communication method, and computer program capable of preferably superimposing the graphics on the uncompressed image data received from the external device to transmit to another external device.

The HDMI repeater to which the technology disclosed in this specification is applied superimposes the graphics on the uncompressed image data originally having a wide luminance dynamic range transmitted from the HDMI source device with appropriate luminance to retransmit, so that it is possible to display with appropriately bright graphics luminance on the HDMI sink device side such as the display device.

Meanwhile, the effect described in this specification is illustrative only and the effect of the present invention is not limited to this. There also is a case in which the present invention has another additional effect in addition to the above-described effect.

Still another object, feature, and advantage of the technology disclosed in this specification will become clear by further detailed description with reference to an embodiment to be described later and the attached drawings.

BRIEF DESCRIPTION OF DRAWINGS

FIG. 2 is a view illustrating a syntax example of "knee_function_info supplemental enhancement information (SEI)".

FIG. 7 is a view illustrating a data structure example of Vendor Specific Data Block area.

FIG. 8 is a view illustrating a data structure example (first example) of a VSIF packet which transmits the dynamic range conversion definition information.

FIG. 9 is a view illustrating a data structure example (second example) of the VSIFpacket which transmits the dynamic range conversion definition information.

FIG. 10 is a view illustrating a data structure example of a DRIF packet.

FIG. 11B is a view illustrating a data structure example of the IP packet used in the bi-directional high-speed bus interface.

MODE FOR CARRYING OUT THE INVENTION

An embodiment of the technology disclosed in this specification is hereinafter described in detail with reference to the drawings.

Configuration of AV System

Figure 1:
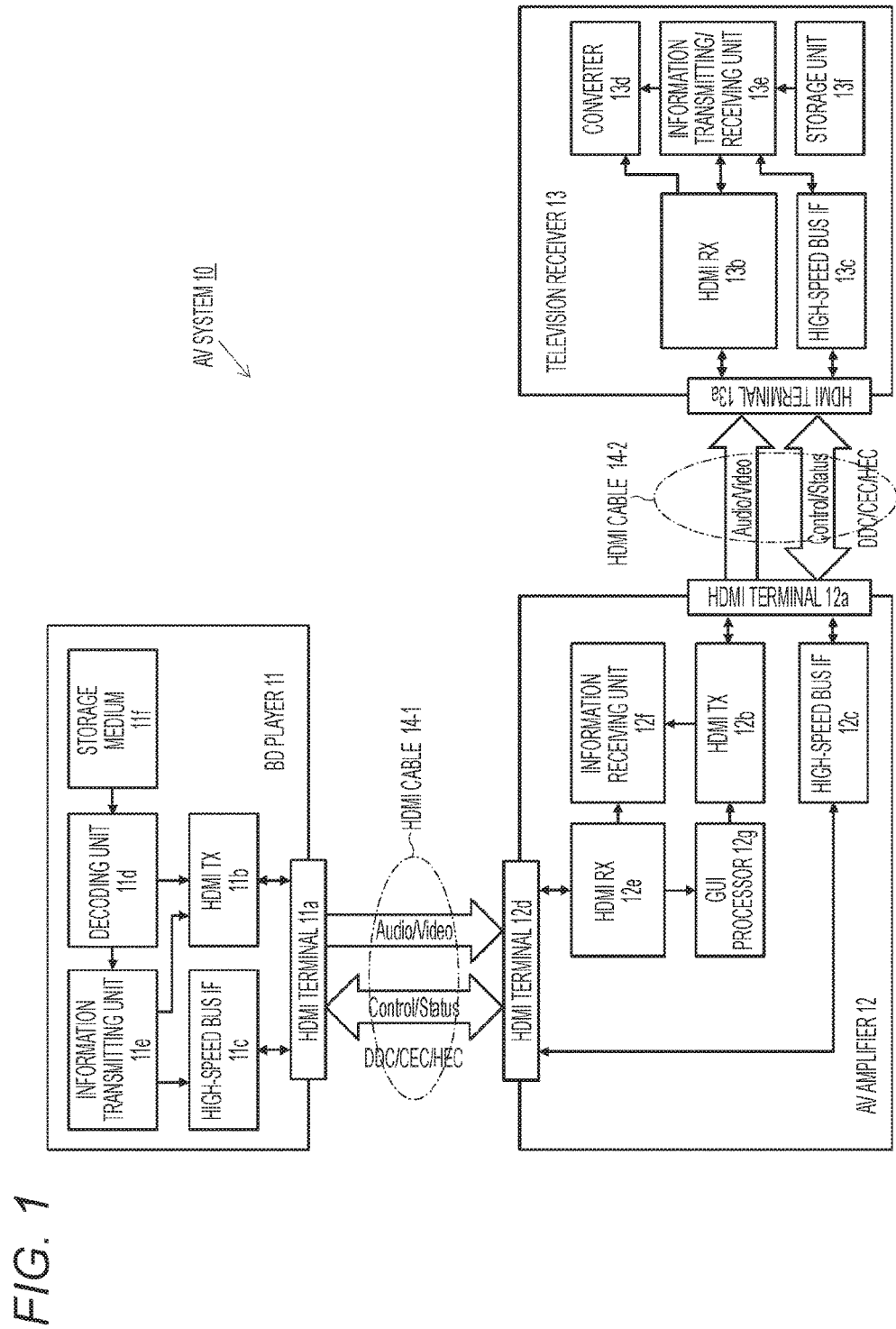
FIG. 1 is a view illustrating a configuration example of an AV system 10 to which technology disclosed in this specification is applied.

FIG. 1 illustrates a configuration example of an audio visual (AV) system 10 to which the technology disclosed in this specification is applied. The illustrated AV system 10 is provided with a BD player 11 as an HDMI source device, an AV amplifier 12 as an HDMI repeater device, and a television receiver 13 as an HDMI sink device. The BD player 11 and the AV amplifier 12 are connected to each other through an HDMI cable 14-1 as a transmission path. Also, the AV amplifier 12 and the television receiver 13 are connected to each other through an HDMI cable 14-2 as a transmission path.

The BD player 11 is provided with a storage medium 11f which stores coded compressed image data, a decoding unit 11d which reads the coded data from the storage medium 11f to decode to an uncompressed image, an information transmitting unit 11e which obtains dynamic range conversion definition information (to be described later) from the data decoded by the decoding unit 11d to transmit to the AV amplifier 12 through the transmission path (HDMI cable) 14-1, and an HDMI terminal 11a to which an HDMI transmitting unit (HDMI TX) 11b and a high-speed bus interface (high-speed bus I/F) 11c are connected.

One end of the HDMI cable 14-1 is connected to the HDMI terminal 11a of the BD player 11 and the other end of the HDMI cable 14-1 is connected to an HDMI terminal 12d of the AV amplifier 12.

The AV amplifier 12 is provided with the HDMI terminal 12d to which an HDMI receiving unit (HDMI RX) 12e which receives the uncompressed image data from the BD player 11 and a high-speed bus interface (high-speed bus I/F) 12c are connected, an information receiving unit 12f which obtains the dynamic range conversion definition information through the transmission path 14-1, a graphical user interface (GUI) processor 12g which generates graphics by an instruction by a user and superimposes the same on the uncompressed image data transmitted from the BD player 11, and an HDMI terminal 12a to which an HDMI transmitting unit (HDMI TX) 12b which transmits the uncompressed image data on which the graphics are superimposed to the television receiver 13 through the transmission path 14-2 and the high-speed bus interface (high-speed bus I/F) 12c are connected.

One end of the HDMI cable 14-2 is connected to the HDMI terminal 12a of the AV amplifier 12 and the other end of the HDMI cable 14-2 is connected to an HDMI terminal 13a of the television receiver 13.

The television receiver 13 is provided with the HDMI terminal 13a to which an HDMI receiving unit (HDMI RX) 13b and a high-speed bus interface (high-speed bus I/F) 13c are connected, an information transmitting/receiving unit 13e which receives the dynamic range conversion definition information of the uncompressed image transmitted from the BD player 11 and transmits a transmission system of the dynamic range conversion definition information which the television receiver 13 may support to the BD player 11, a converter 13d which converts a dynamic range of the uncompressed image received by the HDMI receiving unit 13b on the basis of the received dynamic range conversion definition information, and a storage unit 13f which stores the transmission system of the dynamic range conversion definition information.

The uncompressed image data read from the storage medium 11f in the BD player 11 to be decoded by the decoding unit 11d is originally the uncompressed image data having a wide luminance dynamic range, but this is converted to have a standard luminance dynamic range. That is to say, an original image having a standard or higher luminance dynamic range is transmitted from the BD player 11 as the HDMI source device after this is compressed to have the standard luminance dynamic range.

In contrast, the television receiver 13 is provided with a display device such as an organic display and an LCD which may display an image brighter than the standard luminance of approximately 1000 cd/m$^2$, for example. In such a case, it is desirable that the television receiver 13 side as the HDMI sink device performs dynamic range reverse conversion on the image data converted to have the standard luminance dynamic range and returns the same to the original image data having the high luminance dynamic range, thereby performing image display to make use of its own capability.

In the AV system 10 according to this embodiment, the HDMI source device transmits the uncompressed image data on which the dynamic range conversion is performed together with the dynamic range conversion definition information. In such a case, the HDMI sink device side may display the original image having the standard or higher luminance dynamic range on a screen thereof by performing the dynamic range reverse conversion on the basis of the conversion definition information on the received uncompressed image data.

As a method of performing the dynamic range conversion of the image data, knee conversion is widely known (for example, refer to Patent Document 3). When compressing the dynamic range, knee compression is performed, and when restoring to an original high dynamic range, knee extension is performed. At the time of knee compression, a slope of an input/output characteristic is made smaller for a luminance signal higher than a predetermined luminance level referred to as a knee point to compress the dynamic range. The knee point is set to be lower than a desired maximum luminance level. Additionally, the slope of the input/output characteristic which is made smaller is referred to as a knee slope. At the time of knee extension, processing opposite to the above may be performed. The dynamic range conversion definition information is the information including a parameter required for the dynamic range conversion by the knee conversion and the like.

For example, the specification of Japanese Patent Application Laid-Open No. 2013-246876 already assigned to the present applicant discloses the AV system which transmits the uncompressed image data on which the dynamic range conversion is performed together with the dynamic range conversion definition information from the HDMI source device to the HDMI sink device.

Syntax Example of Knee_Function_Info_SEI

In the AV system 10 illustrated in FIG. 1, the dynamic range conversion definition information of the uncompressed image data is read from the storage medium 11f of the BD player 11. FIG. 2 illustrates a syntax example 200 of "knee_function_info supplemental enhancement information (SEI)" being the dynamic range conversion definition information of the uncompressed image data.

In the knee_function_info 200, a knee conversion ID (knee_function_id) 201 and a knee conversion cancel flag (knee_function_cancel_flag) 202 are set.

The knee conversion ID 201 is the ID specific to an object of the knee conversion being the knee compression or the knee extension. In addition, the knee conversion cancel flag 202 is the flag indicating whether to cancel continuity of immediately preceding knee_function_info. The knee conversion cancel flag 202 is set to a high level "1" when the continuity of the preceding knee_function_info is cancelled and is set to a low level "0" when this is not cancelled.

In addition, when the knee conversion cancel flag 202 is set to the low level "0", the dynamic range conversion definition information is set in the knee_function_info 200. In the dynamic range conversion definition information, a persistence flag (knee_function_persistence_flag) 203, a compression/extension flag (mapping_flag) 204, input image dynamic range information (input_d_range) 205, input image display maximum luminance information (input_disp_luminance) 206, output image dynamic range information (output_d_range) 207, output display maximum luminance information (output_disp_luminance) 208, and number of knee points information (num_knee_point_minus1) 209 are set. Furthermore, loops 210 of information for respective knee points as many as the number in the number of knee points information 209 are arranged, and pre-conversion point information (input_knee_point) 211 and post-conversion point information (output_knee_point) 212 for each knee point are set for each knee point in each loop.

The persistence flag 203 indicates whether the knee_function_info 200 once transmitted is also active thereafter or this is active only once. When the knee_function_info 200 is active only for a picture to which this is added, the persistence flag 203 is set to a low level "0" and when this is active until a stream is switched or until a new knee conversion ID 201 comes, the persistence flag 203 is set to a high level "1".

The compression/extension flag 204 is the flag indicating whether the knee conversion is the knee compression. That is to say, in a case in which the number of knee points is one, the knee conversion may be determined to be the knee extension when the pre-conversion point information is not smaller than the post-conversion point information, and the knee conversion may be determined to be the knee compression when the pre-conversion point information is smaller than the post-conversion point information.

However, when there is a plurality of knee points, it is not possible to correctly determine whether the knee conversion is the knee extension or the knee compression using size relationship between the pre-conversion point information and the post-conversion point information, so that the compression/extension flag 204 is set. Meanwhile, it is also possible that the compression/extension flag 204 is set even when the number of knee points is one. The compression/extension flag 204 is set to a high level "1" when the knee conversion is the knee compression and set to a low level "0" when this is the knee extension.

The number of knee points information 209 is a value obtained by subtracting one from the number of knee points. In each of the loops as many as the number of knee points subsequent thereto, the pre-conversion point information 211 and the post-conversion point information 212 in a knee point i are stored. Meanwhile, order i (i is an integer not smaller than zero) in which the pre-conversion point information 211 and the post-conversion point information 212 of the knee point are set is in ascending order of the pre-conversion point information 211.

The pre-conversion point information 211 is the information indicating the knee point of the image to be coded before the conversion of the dynamic range conversion, permillage of the knee point when a maximum value of the luminance of the image to be coded is 1000%. The knee point is the luminance other than zero of a start point of a range of the luminance on which the knee conversion is performed with the same conversion ratio of the luminance dynamic range of the image to be coded.

The post-conversion point information 212 is the information indicating the start point of the range of the luminance corresponding to the range of the luminance on which the knee conversion is performed starting with the knee point of the image after the conversion of the dynamic range conversion. Specifically, the post-conversion point information (output_knee_point) is permillage of the luminance of the converted image corresponding to the knee point when the maximum value of the luminance of the converted image is 1000%.

Figure 3:
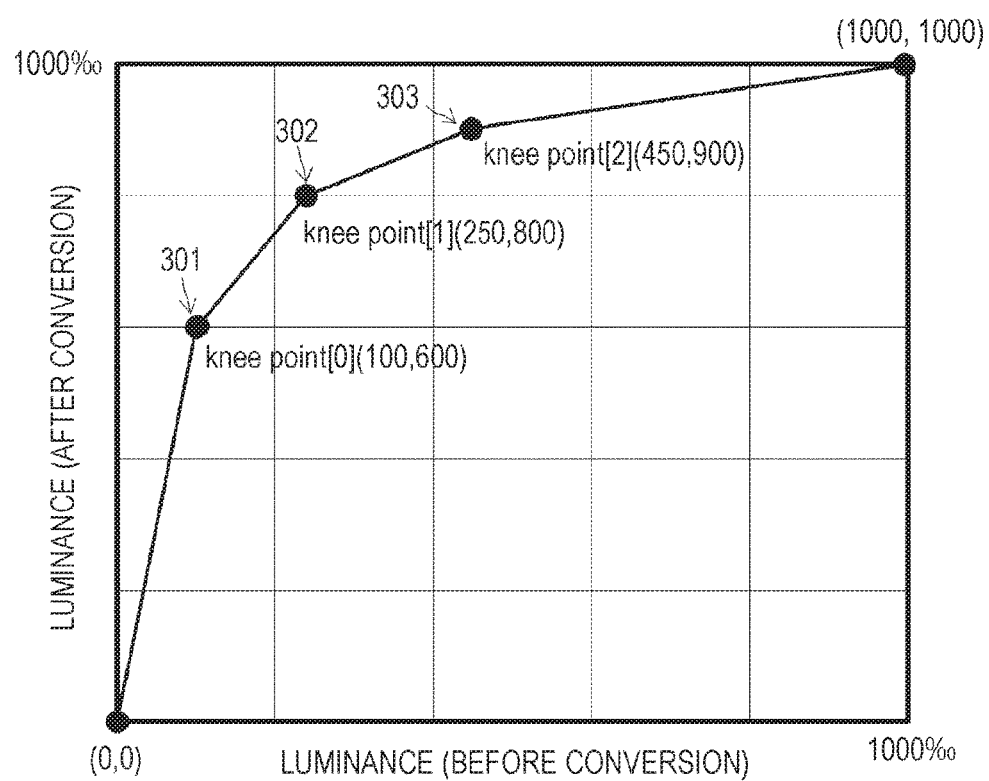
FIG. 3 is a view for illustrating dynamic range conversion definition information.

FIG. 3 illustrates an example of the dynamic range conversion definition information. In the drawing, the dynamic range before the conversion and the dynamic range after the conversion are plotted along the abscissa and the ordinate, respectively. The user makes a second dynamic range image obtained as a result of the knee conversion of the luminance of a high-dynamic range image 0 to 40%, 40 to 100%, 100 to 180%, and 180 to 400% to 0 to 60%, 60 to 80%, 80 to 90%, and 90 to 100%, respectively, a desired converted image.

In this case, 100 is set as the pre-conversion point information (input_knee_point [0]) of a first knee point 301 and 600 is set as the post-conversion point information (output_knee_point [0]) in the knee_function_info_SEI. Also, 250 is set as the pre-conversion point information (input_knee_point [1]) of a second knee point 302 and 800 is set as the post-conversion point information (output_knee_point [1]). Also, 450 is set as the pre-conversion point information (input_knee_point [2]) of a third knee point 303 and 900 is set as the post-conversion point information (output_knee_point [2]).

Also, in the example illustrated in FIG. 3, as another parameter of the knee_function_info_SEI, suppose that the input image dynamic range information (input_d_range) is 4000, the input image display maximum luminance information (input_disp_luminance) is 800 (cd/m$^2$), and a compression flag (mapping_flag) is 1.

Therefore, when receiving the dynamic range conversion definition information illustrated in FIG. 3, the television receiver 13 recognizes that luminance output_knee_point in the first to third knee points are 60%, 80%, and 90%, respectively. Also, the television receiver 13 recognizes that the maximum value of the luminance of the image to be coded is 400% from the input image dynamic range information.

Then, the television receiver 13 connects the knee points in set order, thereby performing the knee conversion on the luminance 0 to 40%, 40 to 100%, 100 to 180%, and 180 to 400% of the high dynamic range image obtained as a result of decoding to obtain 0 to 60%, 60 to 80%, 80 to 90%, and 90 to 100%, respectively. As a result, the television receiver 13 may convert the high dynamic range image obtained by decoding to the desired second dynamic range image.

In the AV system 10 illustrated in FIG. 1, when the AV amplifier 12 is inserted on the HDMI transmission path between the BD player 11 and the television receiver 13, the AV amplifier 12 may also superimpose the graphics. At that time, when the AV amplifier 12 sets graphics luminance without consideration of the characteristic of the dynamic range conversion performed by the television receiver 13, graphics display with the luminance which is not desired is realized by the dynamic range conversion of the television receiver 13. In order to obtain the graphics display with the desired luminance also by the dynamic range conversion by the television receiver 13, the AV amplifier 12 also receives the dynamic range conversion definition information of the uncompressed image data transmitted through the HDMI transmission path and generates the graphics image data on the basis of the dynamic range conversion definition information to superimpose.

Configuration Example of HDMI Transmission Path

Figure 4:
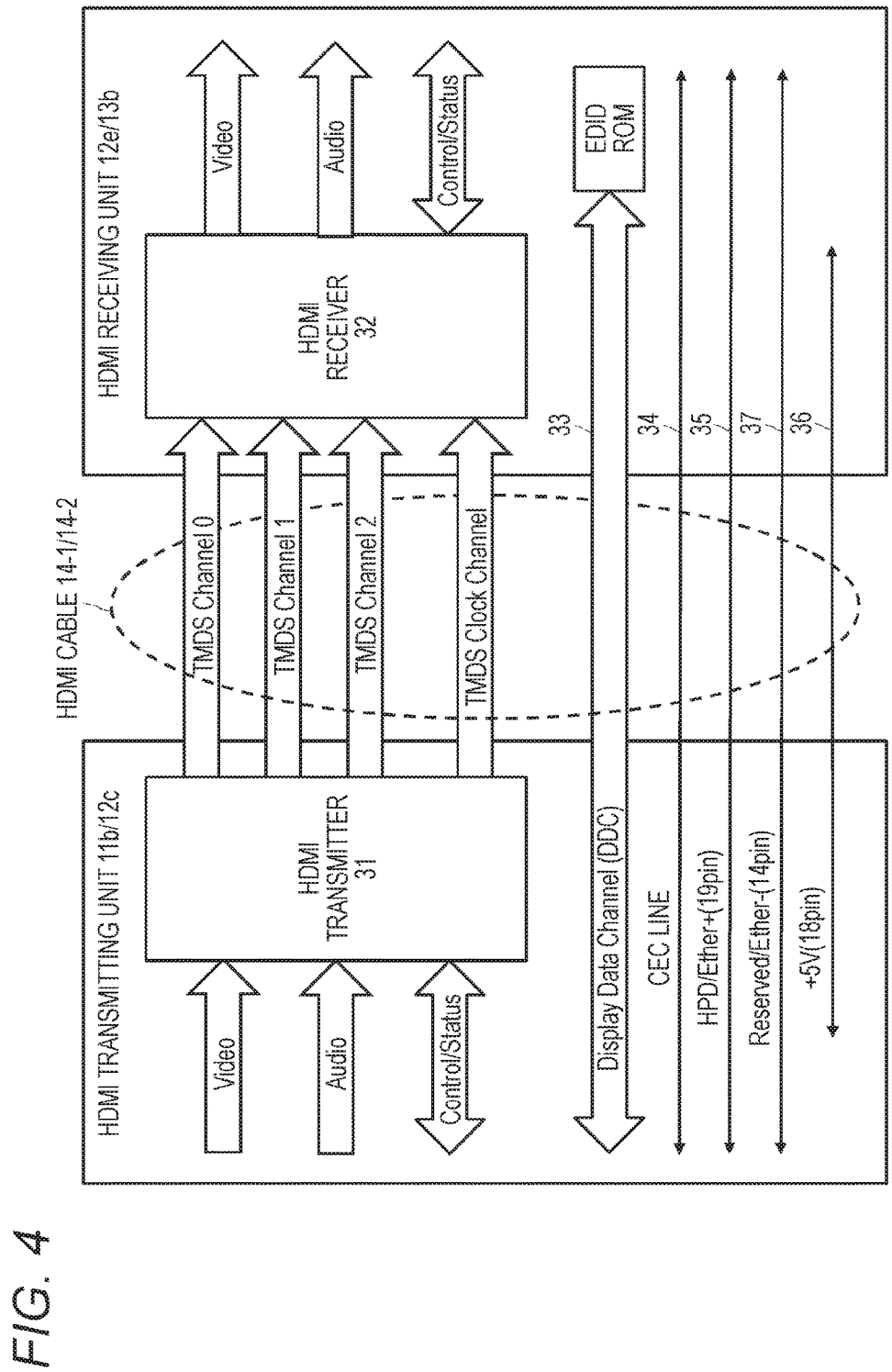
FIG. 4 is a view illustrating a functional configuration example of an HDMI transmitting unit 11b on a BD player 11 side and an HDMI receiving unit 12e on an AV amplifier 12 side.

FIG. 4 illustrates a functional configuration example of the HDMI transmitting unit 11b on the BD player 11 side and the HDMI receiving unit 12e on the AV amplifier 12 side in the AV system 10 illustrated in FIG. 1. Meanwhile, although the configuration is described in the example of the HDMI transmitting unit 11b and the HDMI receiving unit 12e between the BD player 11 and the AV amplifier 12 in FIG. 4, an internal configuration of the HDMI transmitting unit 12b of the AV amplifier 12 and the HDMI receiving unit 13b of the television receiver 13 being the other combination of the HDMI source device and the HDMI sink device is similar to this.

Figure 5:
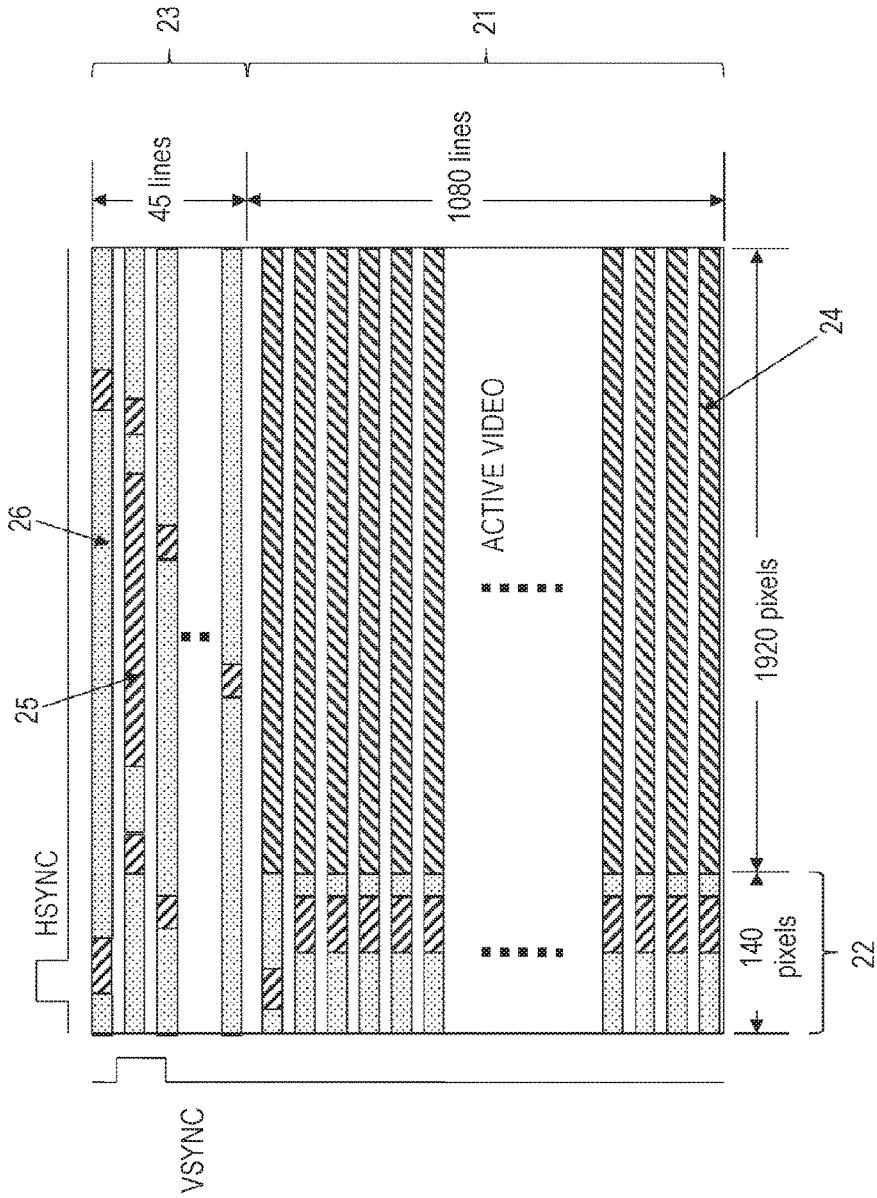
FIG. 5 is a view illustrating a period of various transmission data when image data of 1920 pixels by 1080 lines (in horizontal and vertical directions) is transmitted through TDMS channels #0, #1, and #2.

The HDMI is a high-speed digital data transmission interface in which transition minimized differential signaling (TMDS) is used in a physical layer. In the example illustrated in FIG. 4, the HDMI cable 14 is formed of a total of four channels which are three TDMS channels #0, #1, and #2 for transmitting three types of image signals of red (R)/green (G)/blue (B), and one TMDS clock channel for transmitting a reference clock signal. Also, FIG. 5 illustrates periods of various transmission data when the image data of 1920 pixels by 1080 lines (in horizontal and vertical directions) is transmitted through the TDMS channels #0, #1, and #2.

The HDMI transmitting unit 11b transmits differential signals corresponding to pixel data of the uncompressed image of one screen to the HDMI receiving unit 12e in one direction through a plurality of TMDS channels #0 to #2 in an active image period 21 (hereinafter, also appropriately referred to as an active video period) being the period obtained by removing a horizontal blanking period 22 and a vertical blanking period 23 from a period from one vertical synchronization signal (VSYNC) to a next vertical synchronization signal. Also, the HDMI transmitting unit 11b transmits the differential signals corresponding to at least audio data and control data accompanying with the image and another auxiliary data to the HDMI receiving unit 12e in one direction through a plurality of TMDS channels #0 to #2 in the horizontal blanking period 22 or the vertical blanking period 23.

The HDMI transmitting unit 11b is provided with an HDMI transmitter 31. The HDMI transmitter 31 converts the pixel data of the uncompressed image to the corresponding differential signals and serially transmits the same in one direction to the HDMI receiving unit 12e through the three TMDS channels #0, #1, and #2 being a plurality of channels, for example.

Also, the HDMI transmitter 31 converts the audio data accompanying with the uncompressed image, furthermore, required control data and another auxiliary data to the corresponding differential signals and serially transmits the same to the HDMI receiving unit 12e in one direction through the three TMDS channels #0, #1, and #2. Furthermore, the HDMI transmitter 31 transmits a pixel clock synchronized with the pixel data transmitted through the three TMDS channels #0, #1, and #2 to the HDMI receiving unit 12e through the TMDS clock channel. Herein, 10-bit pixel data is transmitted during one clock of the pixel clock through one TMDS channel #i (i=0, 1, or 2).

The HDMI receiving unit 12e receives the differential signals corresponding to the pixel data transmitted in one direction from the HDMI transmitting unit 11b through a plurality of channels in the active video period 21. Also, the HDMI receiving unit 12e receives the differential signals corresponding to the audio data and the control data transmitted in one direction from the HDMI transmitting unit 11b through a plurality of channels in the horizontal blanking period 22 or the vertical blanking period 23.

That is to say, the HDMI receiving unit 12e includes an HDMI receiver 32. The HDMI receiver 32 receives the differential signals corresponding to the pixel data and the differential signals corresponding to the audio data and the control data transmitted in one direction from the HDMI transmitting unit 11b connected thereto through the HDMI cable 15 through the TMDS channels #0, #1, and #2. At that time, this receives in synchronization with the pixel clock also transmitted from the HDMI transmitting unit 11b through the TMDS clock channel.

There are transmission channels referred to as a Display Data Channel (DDC) 33 and a Consumer Electronics Control (CEC) line 34 in addition to the three TMDS channels #0, #1, and #2 as the transmission channels for transmitting the pixel data and the audio data and the TMDS clock channel as the transmission channel to transmit the pixel clock as the transmission channel of an HDMI system formed of the HDMI transmitting unit 11b and the HDMI receiving unit 12e. This is similar for the transmission channel of the HDMI system formed of the HDMI transmitting unit 12b and the HDMI receiving unit 13b.

The DDC 33 is formed of two signal lines included in the HDMI cable 14-1 and is used by the HDMI transmitting unit 11b for reading Enhanced Extended Display Identification Data (E-EDID) from the HDMI receiving unit 12e connected thereto through the HDMI cable 14-1. That is to say, the HDMI receiving unit 12e is provided with an EDID read only memory (ROM) which stores the E-EDID being capability information regarding its own capability (configuration capability) in addition to the HDMI receiver 32.

The HDMI transmitting unit 11b reads the E-EDID of the HDMI receiving unit 12e from the HDMI receiving unit 12e connected thereto through the HDMI cable 14-1 through the DDC 33. Then, the HDMI transmitting unit 11b recognizes setting of the capability of the HDMI receiving unit 12e, that is to say, for example, a format (profile) of the image which the HDMI sink device 12 provided with the HDMI receiving unit 12e supports, for example, RGB, YCbCr4:4:4, YCbCr4:2:2 and the like on the basis of the E-EDID.

The CEC line 34 formed of one signal line included in the HDMI cable 14-1 is used for performing bi-directional communication of the data for control between the HDMI transmitting unit 11b and the HDMI receiving unit 12e.

An HPD/Ether+ line 35 connected to a pin 19 referred to as hot plug detect (HPD) is also included in the HDMI cable 14-1. The BD player 11 (HDMI source device) may detect connection of the HDMI sink device such as the AV amplifier 12 and the television receiver 13 by direct-current bias potential by using the HPD/Ether+ line 35. In this case, the HPD/Ether+ line 35 has a function of receiving notification of a connection status from the HDMI sink device by the direct-current bias potential as seen from the HDMI source device side. On the other hand, as seen from the HDMI sink device side, the HPD/Ether+ line 35 has a function of notifying the HDMI source device of the connection status by the direct-current bias potential.

The HDMI cable 14-1 also includes a power source line 36 used for supplying power from the HDMI source device to the HDMI sink device.

Furthermore, the HDMI cable 14-1 includes a reserved/Ether− line 37 connected to a reserved pin 14. There also is a case in which a pair of differential transmission paths is formed of the HPD/Ether+ line 35 and the reserved/Ether− line 37 to be used as a bi-directional communication path through which high-speed local area network (LAN) communication may be performed, that is to say, a high-speed bus (high speed Ether channel: HEC). It is possible to perform high-speed data communication through such high-speed bus (HEC line) between the high-speed bus interface 11c on the BD player 11 side and the high-speed bus interface 12c on the AV amplifier 12 side. Similarly, it is possible to perform the high-speed data communication through the high-speed bus (HEC line) also between the high-speed bus interface 12c on the AV amplifier 12 side and the high-speed bus interface 13c on the television receiver 13 side.

Configuration Example of TMDS Channel

Herein, a period of the TDMS transmission data illustrated in FIG. 5 is described in detail. A video field in which the transmission data is transmitted through the three HDMI TMDS channels #0, #1, and #2 includes three types of periods: a video data period 24 filled with diagonal lines from upper left to lower right in the drawing, a data island period 25 filled with diagonal lines from upper right to lower left, and a control period 26 filled with dots according to the types of the transmission data.

Herein, the video field period being the period from an active edge of a certain vertical synchronization signal to an active edge of a next vertical synchronization signal is divided into the horizontal blanking period 22, the vertical blanking period 23, and the active pixel period 21 (active video), the period obtained by removing the horizontal blanking period and the vertical blanking period from the video field period.

The video data period 24 is assigned to the active pixel period 21. In the video data period 24, data of active pixels of 1920 pixels by 1080 lines forming the uncompressed image data of one screen is transmitted. On the other hand, the data island period 25 and the control period 26 are assigned to the horizontal blanking period 22 and the vertical blanking period 23. In the data island period 25 and the control period 26, the auxiliary data is transmitted.

That is to say, the data island period 25 is assigned to a part of the horizontal blanking period 22 and the vertical blanking period 23. In the data island period 25, packets of data which does not relate to the control, for example, the audio data out of the auxiliary data are transmitted. Also, the control period 26 is assigned to another part of the horizontal blanking period 22 and the vertical blanking period 23. In the control period 26, the data related to the control such as the vertical synchronization signal, the horizontal synchronization signal (HSYNC), and the control packet out of the auxiliary data are transmitted.

Data Structure Example of EDID

Figure 6:
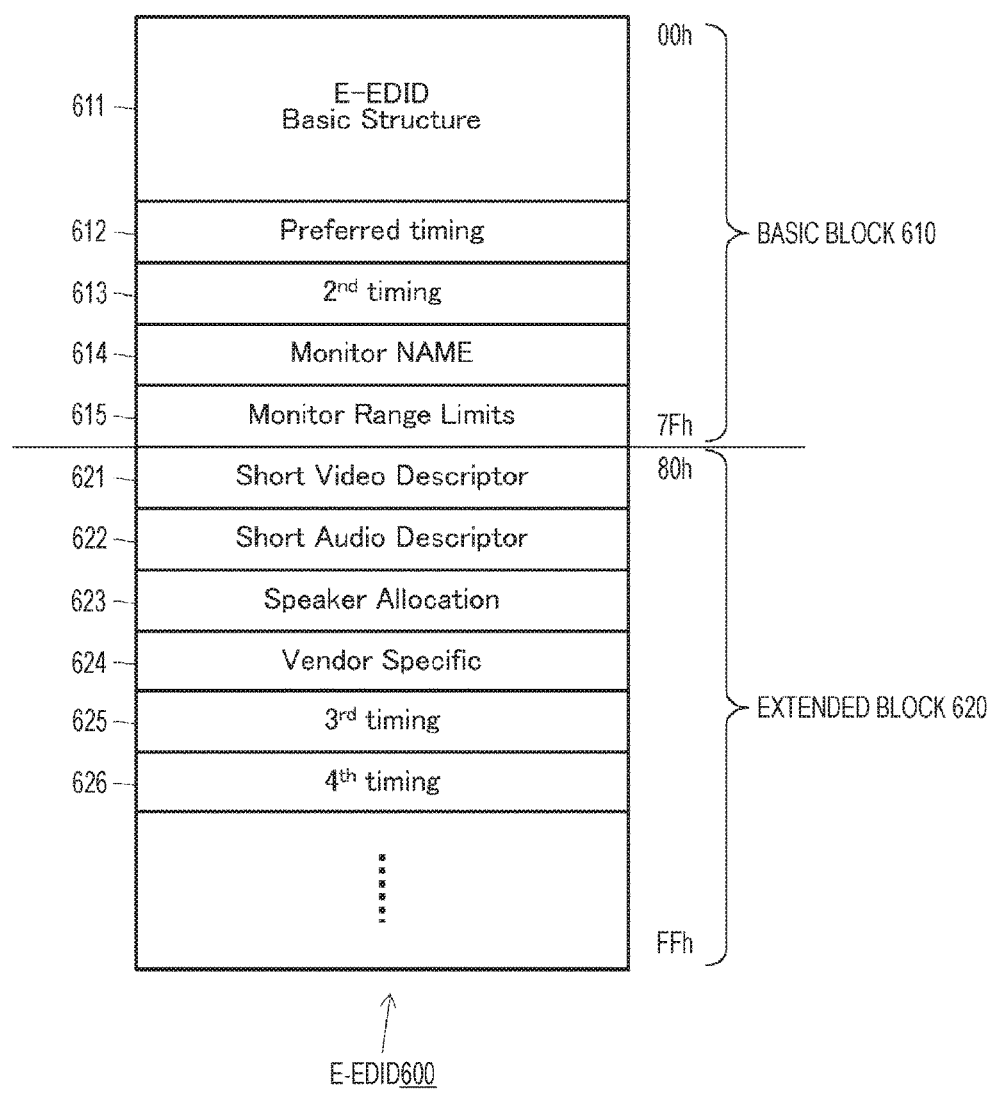
FIG. 6 is a view illustrating a data structure example of E-EDID.

It is already described that the HDMI receiving unit in the HDMI sink device stores the E-EDID being its own capability information in the EDID ROM. FIG. 6 illustrates a data structure example 600 of the E-EDID stored in the EDID ROM in the HDMI receiving unit 13b of the television receiver 13 as the HDMI sink device. The E-EDID 600 is formed of a basic block 610 and an extended block 620.

Data 611 defined by an E-EDID 1.3 standard represented by "E-EDID 1.3 Basic Structure" is arranged at the top of the basic block 610, and then, timing information 612 for maintaining compatibility with the conventional EDID represented by "Preferred timing" and timing information 613 different from "Preferred timing" for maintaining the compatibility with the conventional EDID represented by "2nd timing" are arranged.

Also, in the basic block 610, subsequent to "2nd timing", information 614 indicating a name of a display device represented by "Monitor NAME", and information 615 indicating the number of pixels which may be displayed when an aspect ratio is 4:3 and 16:9 represented by "Monitor Range Limits" are arranged in order.

Data in which an image size (resolution) which may be displayed 621, a frame rate, information indicating whether it is interlace or progressive, and information such as the aspect ratio are described represented by "Short Video Descriptor", data in which information 622 of an audio CODEC system which may be replayed, a sampling frequency, a cut off band, a CODEC bit number and the like is described represented by "Short Audio Descriptor", and information 623 regarding right and left speakers represented by "Speaker Allocation" are arranged in order at the top of the extended block 620.

Also, in the extended block 620, subsequent to "Speaker Allocation", a data block (VSDB) 624 specifically defined for each manufacturer represented by "Vender Specific", timing information 625 for maintaining the compatibility with the conventional EDID represented by "3rd timing", and timing information 626 for maintaining the compatibility with the conventional EDID represented by "4th timing" are arranged.

Data Structure Example of Vendor Specific Data Block (VSDB) Area

In this embodiment, a data area extended for storing number of knee points information which the television receiver 13 may support is defined in the VSDB area. FIG. 7 illustrates a data structure example 700 of the VSDB area. In the VSDB area 700, zeroth to Nth blocks being one-byte blocks are provided.

In a fourth bit of an eighth byte, a flag indicating whether there is the related information of the dynamic range conversion definition information of the uncompressed image data is defined, and in a ninth byte, a data area of the related information of the dynamic range conversion definition information which the television receiver 13 should store.

First, the zeroth to eighth bytes are described. In the zeroth byte arranged at the top of the data represented by "Vender Specific", a header indicating the data area represented by "Vendor-Specific tag code (=3)" and information indicating length of the VSDB data represented by "Length (=N)" are arranged. Also, in the first to third bytes, information indicating a number "0x000C03" registered for the HDMI represented by "24 bit IEEE Registration Identifier (0x000C03) LSB first" is arranged.

Furthermore, in the fourth and fifth bytes, information indicating a physical address of a 24-bit HDMI sink device represented by each of "A", "B", "C", and "D" is arranged. In the sixth byte, a flag indicating a function which the HDMI sink device supports represented by "Supports-AI", each flag indicating information for specifying the number of bits per pixel represented by each of "DC-48 bit", "DC-36 bit", and "DC-30 bit", a flag indicating whether the sink device supports the transmission of a YCbCr4:4:4 image represented by "DC-Y444", and a flag indicating whether the HDMI sink device supports a dual Digital Visual Interface (DVI) represented by "DVI-Dual" are arranged.

Also, in the seventh byte, information indicating a maximum frequency of the TMDS pixel clock represented by "Max-TMDS-Clock" is arranged. In third to zeroth bits of the eighth byte, three types of flags CNC3 to CNC0 of information specifying support of a function of a content type (CNC) are arranged, respectively. In a fourth bit of the eighth byte, a flag indicating whether there is the related information of the dynamic range conversion definition information which the HDMI sink device supports represented by "knee_Extension" is newly arranged. When the flag is set to a high level "1", this indicates that there is the related information of the dynamic range conversion definition information in a ninth byte.

In seventh to fifth bits of the ninth byte, flags of the transmission systems reception by which the television receiver 13 supports are set as the transmission systems of the dynamic range conversion definition information. When a "DRIF" flag of the seventh bit is set to a high level "1", this indicates that the reception of the dynamic range conversion definition information by a "DRIF" packet (refer to FIG. 10) inserted into the blanking period (data island period 25 or control period 26) of the uncompressed image data is supported. In addition, when a "VSIF" flag in the sixth bit is set to a high level "1", this indicates that the reception of the dynamic range conversion definition information by a "VSIF" packet (refer to FIGS. 8 and 9) inserted into the blanking period (data island period 25 or control period 26) in the uncompressed image data is supported. Furthermore, when a "HEC" flag of the fifth bit is set to a high level "1", this indicates that the reception of the dynamic range conversion definition information by an IP packet on the bi-directional communication path by using the high-speed bus interface (HEC line) formed of the HPD/Ether+ line 35 and the reserved/Ether- line 37 (refer to FIG. 4) is supported.

In a tenth byte, the number knee points information (integer i not smaller than one) of the dynamic range conversion definition information which the television receiver 13 supports is set.

In the AV system 10 illustrated in FIG. 1, the BD player 11 as the HDMI source device confirms whether the television receiver 13 being the HDMI sink device is connected by the HPD/Ether+ line 35 (refer to FIG. 4). After the connection of the television receiver 13 is confirmed, the BD player 11 reads the E-EDID from the HDMI receiving unit 13b in the television receiver 13 by using the DDC 33 (refer to FIG. 4) and recognizes the related information of the dynamic range conversion definition information which the television receiver 13 supports. However, when confirming the connection of the television receiver 13 and obtaining the related information of the dynamic range conversion definition information by the BD player 11, the AV amplifier 12 as the HDMI repeater intervenes.

The BD player 11 sets the number of knee points information which the television receiver 13 may support in the knee_function_info_SEI on the basis of the related information of the dynamic range conversion definition information read from the television receiver 13 as described above when transmitting the uncompressed image data to the television receiver 13. Then, the BD player 11 selects a packet form and the transmission path specified by the flags set in the seventh to fifth bits of the ninth byte and inserts the dynamic range conversion definition information into a payload of the packet to transmit to the television receiver 13.

Data Structure Example of VSIF Packet

The BD player 11 may insert the dynamic range conversion definition information of the uncompressed image data currently transmitted into the blanking period (data island period 25 or control period 26) of the uncompressed image data to transmit together with the uncompressed image data on which the dynamic range conversion is performed by using an HDMI Vendor Specific InfoFrame (hereinafter, referred to as "VSIF") packet.

FIG. 8 illustrate a data structure example (first example) 800 of the VSIF packet which transmits the dynamic range conversion definition information. The HDMI may transmit accessory information regarding the uncompressed image data from the HDMI source device to the HDMI sink device by the VSIF packet.

"Packet Type (0x81)" indicating the VSIF packet is defined in a zeroth byte. When a data content of the VSIF packet is different from that of the VSIF packet transmitted immediately prior to the same, a level opposite to that in a "CB flag" set in the immediately preceding VSIF packet is set in a first byte of a first byte. That is to say, when the "CB flag" is set to a low level "0" in the immediately preceding VSIF packet and the data content of the subsequent VSIF packet is different, the "CB flag" is set to a high level "1". "Version (0x02)" is set in sixth to zeroth bits of the first byte.

"Length" data is defined in fourth to zeroth bits of a second byte to set byte length of third and subsequent bytes. "Check Sum" is defined in the third byte. In fourth to sixth bytes, information indicating the number "0x000C03" registered for the HDMI represented by "24 bit IEEE Registration Identifier (0x000C03) LSB first" is arranged.

In fourth and third bits of a seventh byte, an "HDR_flag" flag indicating whether there is the dynamic range conversion definition information in eighth and subsequent bytes is specified. When "0b00" is specified in the fourth and third bits, this indicates that there is no dynamic range conversion definition information. When "0b01" is specified in the fourth and third bits, the input image dynamic range information (input_d_range), the input image display maximum luminance information (input_disp_luminance), the output image dynamic range information (output_d_range), and the output display maximum luminance information (output_disp_luminance) out of the dynamic range conversion definition information are specified in subsequent eighth to 23rd bytes Since maximum data length of the VSIF packet illustrated in FIG. 8 is only 31 bytes, it is not possible to transmit entire information of the dynamic range conversion definition information by one VSIF packet when the number of knee points is large. Therefore, the different VSIF packets are arranged in the same image frame to transmit remaining dynamic range conversion definition information. FIG. 9 illustrate a data structure example (second example) 900 of the VSIF packet which transmits the dynamic range conversion definition information.

"Packet Type (0x81)" indicating the VSIF packet is defined in a zeroth byte. "Version (0x01)" indicating a second VSIF packet is set in a first byte. "Length" data is defined in fourth to zeroth bits of a second byte to set byte length of third and subsequent bytes. "Check Sum" is defined in the third byte. In fourth to sixth bytes, information indicating the number "0x000C03" registered for the HDMI represented by "24 bit IEEE Registration Identifier (0x000C03) LSB first" is arranged.

In fourth and third bits of a seventh byte, an "HDR_flag" flag indicating whether there is the dynamic range conversion definition information in eighth and subsequent bytes is specified. When "0b00" is specified in the fourth and third bits, this indicates that there is no dynamic range conversion information. When "0b11" is specified in the fourth and third bits, the knee point information is specified in the eighth and subsequent bytes.

In the eighth byte, the number of pieces of knee point information transmitted by the VSIF packet "knee_point_Number (i)" is specified. In ninth and subsequent bytes, the pre-conversion point information (input_knee_point) and the post-conversion point information (output_knee_point) in each knee point are repeatedly set for every three bytes. Similarly, since the maximum data length of the VSIF packet is also 31 bytes, the maximum number of pieces of the knee point information which may be transmitted is nine.

When transmitting the dynamic range conversion definition information by using the VSIF packet illustrated in FIG. 9, it is required to obtain the two VSIF packets, and further, the number of pieces of the knee point information which may be transmitted is limited to nine, so that processing by the television receiver 13 is complicated. It is also possible to define a new data structure of InfoFrame which may transmit the dynamic range conversion definition information in block to use so as to reduce the processing by the television receiver 13 side.

The AV amplifier 12 as the HDMI repeater reads the E-EDID (refer to FIGS. 6 and 7) from the television receiver 13 by using the DDC 33 and recognizes the "VSIF" flag (in a 67th bit of the ninth byte of the VSDB area) out of the related information of the dynamic range conversion definition information which the television receiver 13 supports. Then, when the uncompressed image data is transmitted from the BD player 11 as the HDMI source, this receives a control packet (VSIF packet illustrated in FIG. 9) into which the dynamic range conversion definition information is inserted on the basis of the "VSIF" flag and adjusts graphics luminance according to a content of the VSIF packet, thereby generating the graphics screen when a graphics screen is superimposed.

Data Structure Example of DRIF Packet

The BD player 11 may insert the dynamic range conversion definition information of the uncompressed image data currently transmitted into the blanking period (data island period 25 or control period 26) of the uncompressed image data to transmit together with the uncompressed image data on which the dynamic range conversion is performed by using the Dynamic Range InfoFrame (hereinafter, referred to as "DRIF") packet newly defined in this embodiment.

FIG. 10 illustrates a data structure example of the DRIF packet newly defined. "Packet Type (0x83)" indicating a type of the data packet is defined in a zeroth byte. "Version (0x01)" indicating a version of the DRIF packet is set in a first byte. "Length" data is defined in a second byte to set byte length of third and subsequent bytes (up to 255). "Check Sum" is defined in the third byte.

A knee conversion cancel flag "CF" is set in a seventh bit of a fourth byte. The knee conversion cancel flag "CF" is the flag indicating whether to cancel continuity of immediately preceding DRIF packet data. When the continuity is cancelled, a high level "1" is set, and when this is not cancelled, a low level "0" is set.

A persistence flag "PF" is set in a sixth bit of the fourth byte. The persistence flag "PF" indicates whether the DRIF packet data transmitted once is also active thereafter or this is active only at once; a low level "0" is set when the DRIF is active only for the picture into which this is inserted and a high level "1" is set when this is active until a stream is switched or until a new DRIF packet comes.

The input image dynamic range information (input_d_range), the input image display maximum luminance information (input_disp_luminance), the output image dynamic range information (output_d_range), and the output display maximum luminance information (output_disp_luminance) are specified in fifth to eighth bytes, ninth to 12th bytes, 13th to 16th bytes, and 17th to 20th bytes, respectively.

In a 21st byte, the number of pieces of the knee point information transmitted by the DRIF packet "Number of knee_point (i)" is specified. In 22nd and subsequent bytes, the pre-conversion point information (input_knee_point) and the post-conversion point information (output_knee_point) in each knee point are repeatedly set for every three bytes.

By transmitting the dynamic range conversion information by using the DRIF packet in this manner, it is possible to solve complication in the processing by the television receiver 13 when the VSIF packet is used.

The AV amplifier 12 as the HDMI repeater reads the E-EDID (refer to FIGS. 6 and 7) from the television receiver 13 by using the DDC 33 and recognizes the "DRIF" flag (in the seventh bit of the ninth byte of the VSDB area) out of the related information of the dynamic range conversion definition information which the television receiver 13 supports. Then, when the uncompressed image data is transmitted from the BD player 11 as the HDMI source, this receives the control packet (DRIF packet illustrated in FIG. 10) into which the dynamic range conversion definition information is inserted on the basis of the "DRIF" flag and adjusts the graphics luminance according to the content of the DRIF packet, thereby generating the graphics screen when the graphics screen is superimposed.

Data Structure Example of IP Packet

Figure 11A:
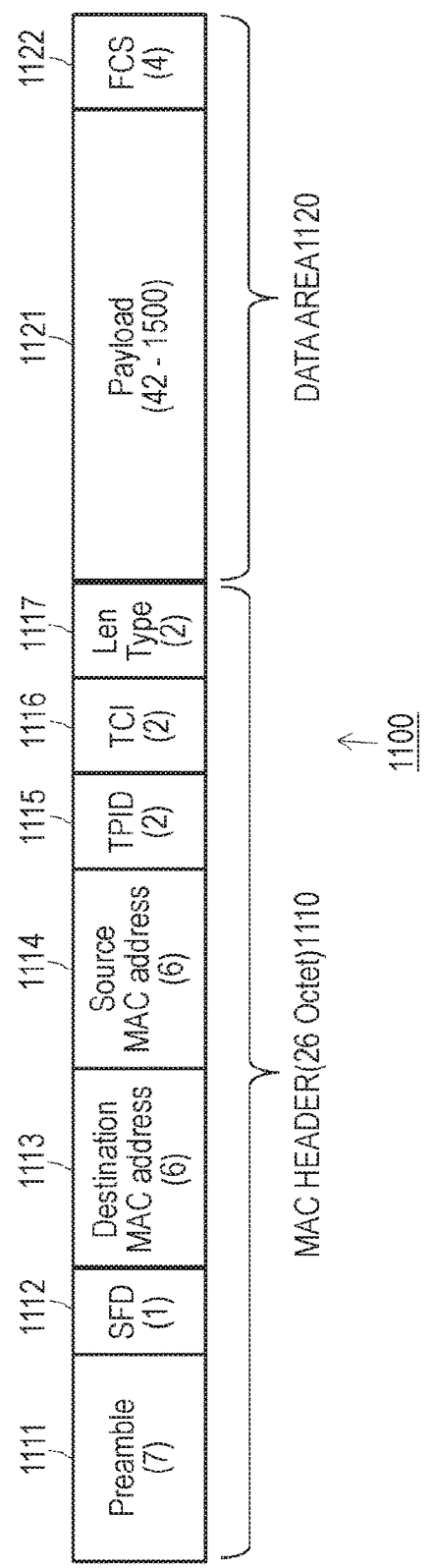
FIG. 11A is a view illustrating a data structure example of an IP packet used in a bi-directional high-speed bus interface.

FIGS. 11A and 11B illustrate a data structure example 1100 of the IP packet used in the bi-directional high-speed bus interface (HEC line) formed of the HPD/Ether+ line 35 and the reserved/Ether− line 37 (refer to FIG. 4). In the HDMI, it is possible to transmit the dynamic range conversion definition information of the uncompressed image data currently transmitted by the IP packet used in the bi-directional high-speed bus interface.

As illustrated in FIG. 11A, the IP packet 1100 is formed of a 26-octet MAC header 1110 and a variable-length data area 1120. The MAC header 1110 is formed of a seven-octet preamble 1111, one-octet start frame delimiter (SFD) 1112, six-octet destination address (destination MAC address) 1113, a six-octet source address (source MAC address) 1114, two-octet tag protocol identifier (TPID) 1115, a two-octet tag control information (TCI) 1116, and a two-octet data length type (Len Type) 1117. Subsequent to the MAC header 1110, the data area 1120 is formed of 42 to 1100-octet payload 1121 and a four-octet frame check sequence (FCS) 1122.

The dynamic range conversion definition information is inserted into the payload 1121 of the IP packet 1100. FIG. 11B illustrates a data structure example 1130 of the dynamic range conversion definition information inserted into the payload 1121. In the illustrated example, the dynamic range conversion definition information is of the same type as the data structure of "knee_function_info_SEI" illustrated in FIG. 2. Please refer to the description of FIG. 2 for a detail of each data included in the "knee_function_info_SEI".

The AV amplifier 12 as the HDMI repeater reads the E-EDID (refer to FIGS. 6 and 7) from the television receiver 13 by using the DDC 33 and recognizes the "HEC" flag (of the fifth bit of the ninth byte of the VSDB area) out of the related information of the dynamic range conversion definition information which the television receiver 13 supports. Then, when the uncompressed image data is transmitted from the BD player 11 as the HDMI source, this receives the control packet (IP packet illustrated in FIGS. 11A and 11B) into which the dynamic range conversion definition information is inserted on the basis of the "HEC" flag and adjusts the graphics luminance according to the "knee_function_info_SEI" stored in the payload of the IP packet to generate the graphics screen when superimposing the graphics screen.

Graphics Processing in AV Amplifier

Figure 12:
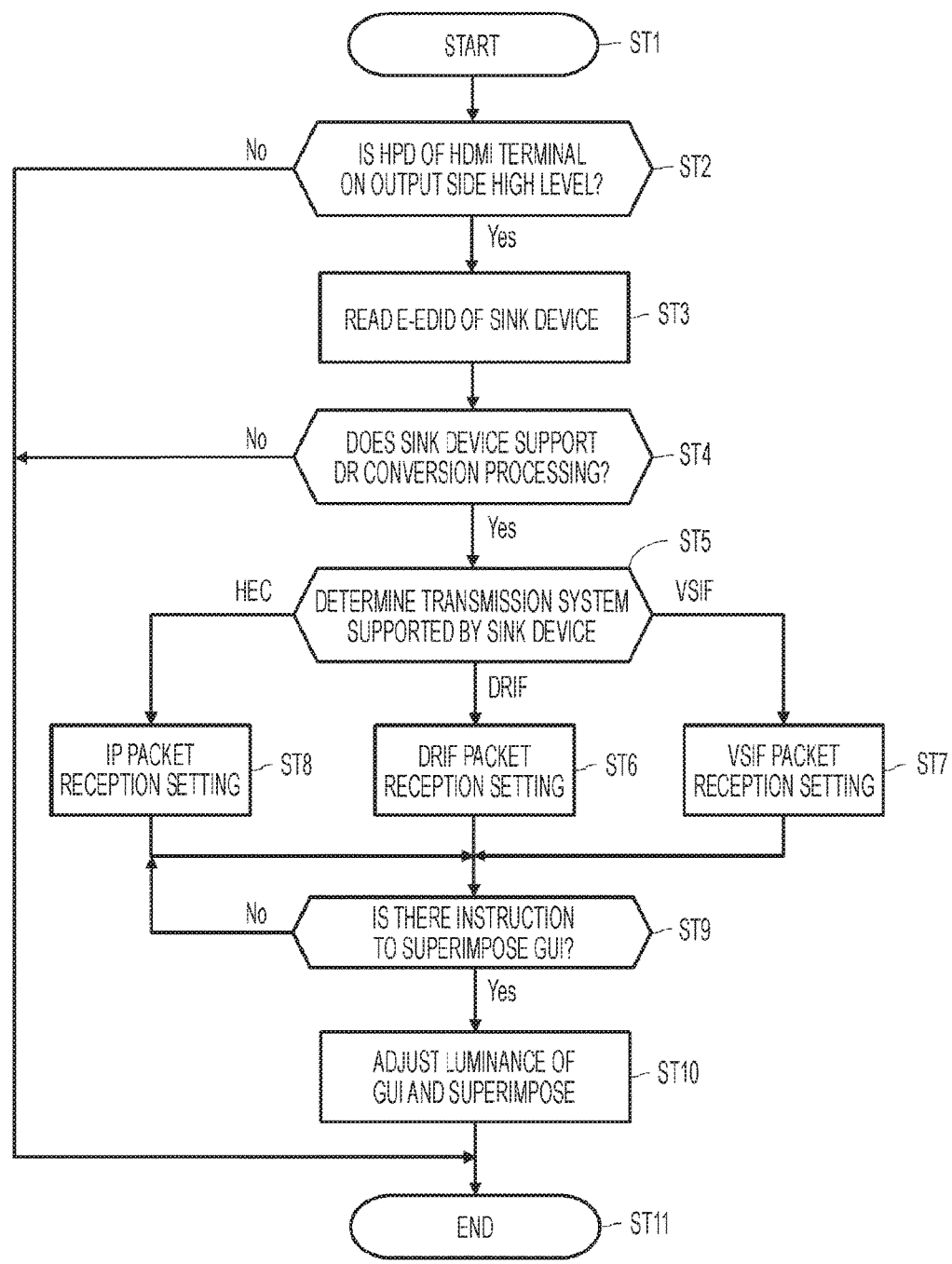
FIG. 12 is a flowchart illustrating a procedure of graphics processing executed by the AV amplifier.

FIG. 12 illustrates a procedure which the AV amplifier 12 as the HDMI repeater executes when retransmitting the uncompressed image data transmitted from the BD player 11 as the HDMI source device to the television receiver 13 as the HDMI sink device as a flowchart.

The AV amplifier 12 starts a process at step ST1 and thereafter shifts to a process at step ST2. At step ST2, the AV amplifier 12 determines whether an HPD signal of the HDMI terminal 12*a* on an output side is set to a high level "1". When the HPD signal is set to a low level "0", this determines that the television receiver 13 is not connected to the AV amplifier 12 and the AV amplifier 12 immediately shifts to step ST11 to finish this processing routine without performing the graphics processing.

When the HPD signal is set to the high level "1", the AV amplifier 12 determines that the television receiver 13 is connected to the AV amplifier and reads the E-EDID of the television receiver 13 at step ST3. Then, the AV amplifier 12 determines whether the television receiver 13 supports dynamic range conversion processing at step ST4. Specifically, this accesses the E-EDID in the HDMI receiving unit 13*b* of the television receiver 13 through the DDC line 33 included in the HDMI cable 14-2 and refers to a "knee_Extension" flag set in the fourth bit of the eighth byte of the VSDB area (refer to FIG. 7) to check whether there is the related information of the dynamic range conversion definition information which the television receiver 13 supports.

At step ST4, when the television receiver 13 does not support the dynamic range conversion processing, the AV amplifier 12 immediately shifts to step ST11 to finish this processing routine without performing the graphics processing.

At step ST4, when the television receiver 13 supports the dynamic range conversion processing, the AV amplifier 12 determines whether the television receiver 13 supports the DRIF packet at step ST5.

Subsequently, at step ST5, the AV amplifier 12 refers to each flag of DRIF, VSIF, and HEC in the seventh to fifth bits of the ninth byte of the VSDB area of the E-EDID read at step ST3 to determine the transmission system which the television receiver 13 supports.

At step ST5, when it becomes clear that the television receiver 13 supports reception by the transmission system by the DRIF packet, at step ST6, the AV amplifier 12 shifts to step ST6, sets the information receiving unit 12*f* to extract the DRIF packet, and extracts the dynamic range conversion definition information from the DRIF packet inserted into the blanking period (data island period 25 or control period 26) of the uncompressed image data transmitted from the BD player 11.

Also, when it becomes clear that the television receiver 13 supports reception by the transmission system by the VSIF packet at step ST5, the procedure shifts to step ST7 and the information receiving unit 12*f* is set to extract the VSIF packet, and the dynamic range conversion definition information is extracted from the DRIF packet inserted into the blanking period of the uncompressed image data transmitted from the BD player 11.

Also, when it becomes clear that the television receiver 13 supports the reception by the transmission system by the bi-directional high-speed bus interface (HEC) at step ST5, the procedure shifts to step ST8 and the information receiving unit 12*f* is set to receive the IP packet from the bi-directional high-speed bus interface (HEC line) to extract the dynamic range conversion definition information from the IP packet received from the BD player 11.

Subsequently, at step ST9, the AV amplifier 12 determines whether superimposition of the graphics screen is specified by the instruction of the user. When this is not specified, the procedure returns to step ST9 to repeat determining the user instruction. When the superimposition of the graphics screen is specified, the procedure shifts to next step ST10.

At step ST10, when the GUI processor 12*g* generates the graphics screen instructed by the user, this adjusts the luminance of the graphics screen on the basis of the dynamic range conversion definition information received by the information receiving unit 12*f* and superimposes the same on the uncompressed image data input from the BD player 11 to HDMI output to the television receiver 13, and thereafter the procedure shifts to step ST11 to be finished.

In this manner, the AV amplifier 12 as the HDMI repeater superimposes the graphics on the uncompressed image data originally having a wide luminance dynamic range transmitted from the HDMI source device such as the BD player 11 with appropriate luminance to retransmit. Therefore, the television receiver 13 connected to the output side of the AV amplifier 12 may display with appropriate graphics luminance.

CITATION LIST

Patent Document

Patent Document 1: Japanese Patent Application Laid-Open No. 2010-135957
Patent Document 2: Japanese Patent Application Laid-Open No. 2012-138757

Patent Document 3: Japanese Patent Application Laid-Open No. 2006-211095

INDUSTRIAL APPLICABILITY

The technology disclosed in this specification is heretofore described in detail with reference to the specific embodiment. However, it is obvious that one skilled in the art may modify or substitute the embodiment without departing from the scope of the technology disclosed in this specification.

Although the method of storing the related information of the dynamic range conversion definition information by using the VSDB area of the E-EDID of the television receiver 13 is used in the above-described embodiment, the technology disclosed in this specification is not limited to this method. In the data structure of the E-EDID, this may also be realized in another data area such as a Video Capability Data Block (VCDB), for example. The data structure other than the E-EDID may also be used.

Also, in the above-described embodiment, the BD player 11 transmits the dynamic range conversion definition information to the television receiver 13 by inserting the same into the blanking period of the uncompressed image data by using the VSIF packet or the DRIF packet. Alternatively, the BD player 11 may also transmit the IP packet in which the dynamic range conversion definition information is stored to the television receiver 13 through the bi-directional communication path formed of the reserved/Ether– line 37 and the HPD/Ether+ line 35 of the HDMI cable 14-1/14-2. In any method, it is possible to transmit the dynamic range conversion definition information in synchronization with the uncompressed image data.

Also, in the above-described embodiment, the E-EDID of the television receiver 13 includes at least one of the number of pieces of the knee point information and the transmission system information which the television receiver 13 supports. Therefore, the BD player 11 may obtain the number of pieces of the knee point information or the transmission system information which the television receiver 13 supports by reading the E-EDID through the DDC 33 of the HDMI cable 14-1/14-2. Alternatively, the BD player 11 may also receive the number of pieces of the knee point information or the transmission system information which the television receiver 13 supports from the television receiver 13 through the CEC line 34 being a control data line of the HDMI cable 14-1/14-2 or the bi-directional communication path formed of the reserved/Ether– line 37 and the HPD/Ether+ line 35 of the HDMI cable 114-1/14-2.

In this specification, the embodiment in which the technology disclosed in this specification is applied to the AV system using the HDMI transmission path is mainly described. However, a baseband digital interface includes a Mobile High-definition Link (MHL), an optical fiber interface, a Digital Visual Interface (DVI) interface, a Display Port (DP) interface, a wireless interface using a 60 GHz millimeter wave is used and the like in addition to the HDMI. The technology disclosed in this specification may similarly be applied to a case in which the related information of the uncompressed image audio data and the transmission system information are transmitted by the digital interfaces.

In addition, although the embodiment in which the technology disclosed in this specification is applied to the AV system in which the BD player 11 is used as the transmitting device (HDMI source device), the AV amplifier 12 is used as the repeater device (HDMI repeater device), and the television receiver 13 is used as the receiving device (HDMI sink device) is mainly described above, it goes without saying that the technology disclosed in this specification may also be similarly applied to the system in which the transmitting device, the repeater device, and the receiving device other than them are used.

In short, the technology disclosed in this specification is heretofore described in a form of an example and the content described in this specification should not be interpreted in a limited manner. In order to determine the scope of the technology disclosed in this specification, claims should be taken into consideration.

Meanwhile, the technology disclosed in this specification may also have the following configuration.

(1) A communication device, including:

a data receiving unit which receives uncompressed image data transmitted from a first external device through a first transmission path;

an information receiving unit which receives dynamic range conversion definition information of the uncompressed image data through the first transmission path;

a graphics processor which adjusts luminance of graphics on the basis of the dynamic range conversion definition information received by the information receiving unit to combine with the uncompressed image data received by the data receiving unit; and a data transmitting unit which transmits the uncompressed image data with which the graphics are combined to a second external device.

(1-1) The communication device according to (1) described above, wherein the information receiving unit receives the dynamic range conversion definition information from the first external device according to a transmission system specified by the second external device.

(2) The communication device according to (1) described above, wherein the information receiving unit receives the dynamic range conversion definition information of the uncompressed image data inserted into a blanking period of the uncompressed image data received by the data receiving unit from the first external device.

(3) The communication device according to (1) described above, wherein the information receiving unit receives the dynamic range conversion definition information of the uncompressed image data through a bi-directional communication path formed of a predetermined line of the first transmission path.

(4) The communication device according to any one of (1) to (3) described above, wherein the data transmitting unit transmits the uncompressed image data with which the graphics are combined to the second external device through a second transmission path.

(5) The communication device according to any one of (1) to (4) described above, wherein the predetermined line of the first transmission path is formed of a pair of differential transmission paths and at least one of the pair of differential transmission paths has a function of notifying of a connection status of the external device.

(6) The communication device according to (4) described above, wherein the information receiving unit receives a control packet in which the dynamic range conversion definition information is stored from the first external device according to transmission system information received from the second external device through the second transmission path.

(7) The communication device according to (4) described above, wherein the information receiving unit receives related information of the dynamic range conversion definition information which the second external device supports through a predetermined line of the second transmission path, and the graphics processor executes processing of the graphics on the uncompressed image data received by the data receiving unit on the basis of the received related information.

(8) The communication device according to (7) described above, wherein the predetermined line of the second transmission path is formed of a pair of differential transmission paths and at least one of the pair of differential transmission paths has a function of notifying of a connection status of the external device.

(9) A communication method including:

a step of receiving transmission system information of dynamic range conversion definition information from a second external device through a second transmission path;

a step of receiving the dynamic range conversion definition information from a first external device on the basis of the transmission system information through a first transmission path;

a step of adjusting luminance of graphics on the basis of the dynamic range conversion definition information and combining the graphics with uncompressed image data transmitted from the first external device through the first transmission path; and a step of transmitting the uncompressed image data with which the graphics are combined to the second external device through the second transmission path.

(10) A computer program described in a computer readable format for allowing a computer to serve as:

a data receiving unit which receives uncompressed image data transmitted from a first external device through a first transmission path;

an information receiving unit which receives dynamic range conversion definition information of the uncompressed image data through the first transmission path;

a graphics processor which adjusts luminance of graphics on the basis of the dynamic range conversion definition information received by the information receiving unit to combine with the uncompressed image data received by the data receiving unit; and a data transmitting unit which transmits the uncompressed image data with which the graphics are combined to a second external device.

(11) A communication system including:

a source device which transmits uncompressed image data;

a sink device which receives the uncompressed image data; and a repeater device which connects to the source device through a first transmission path and connects to the sink device through a second transmission path, wherein the repeater device receives the uncompressed image data and dynamic range conversion definition information of the uncompressed image data transmitted from the source device through the first transmission path, adjusts luminance of graphics on the basis of the dynamic range conversion definition information to combine with the uncompressed image data, and transmits to the sink device through the second transmission path.

REFERENCE SIGNS LIST

10 AV system
11 BD player
11a HDMI terminal
11b HDMI transmitting unit
11c High-speed bus interface
11d Decoding unit
11e Information transmitting unit
11f Storage medium
12 AV amplifier
12a, 12d HDMI terminal
12b HDMI transmitting unit
12c High-speed bus interface
12e HDMI receiving unit
12f Information receiving unit
12g GUI processor
13 Television receiver
13a HDMI terminal
13b HDMI receiving unit
13c High-speed bus interface
13d Converter
13e Information transmitting/receiving unit
13f Storage unit
14-1, 14-2 HDMI cable
31 HDMI transmitter
32 HDMI receiver
33 DDC line
34 CEC line
35 HPD/Ether+ line
36 Power source line
37 Reserved/Ether– line

The invention claimed is:

1. A communication device, comprising:
circuitry configured to:
receive first image data from a first external device via a first transmission path, wherein the first image data is output of a decoding operation in the first external device;
determine a connection status of a second external device with the communication device;
determine whether the second external device supports dynamic range conversion based on the connection status;
receive dynamic range conversion definition information of the first image data via the first transmission path based on the determination that the second external device supports the dynamic range conversion;
adjust, based on the dynamic range conversion definition information, a luminance value of first graphics data, to obtain second graphics data; and
generate second image data based on superimposition of the second graphics data and the first image data; and
transmit the second image data to the second external device.

2. The communication device according to claim 1, wherein the circuitry is further configured to receive, from the first external device, the dynamic range conversion definition information in a blanking period of the first image data.

3. The communication device according to claim 1, wherein the circuitry is further configured to receive the dynamic range conversion definition information via a bi-directional communication path of a specific line of the first transmission path.

4. The communication device according to claim 1, wherein the circuitry is further configured to transmit the second image data to the second external device via a second transmission path.

5. The communication device according to claim 1, wherein a specific line of the first transmission path has a pair of differential transmission paths, and
wherein the circuitry is further configured to receive a notification message that indicates a connection status of the first external device from at least one of the pair of differential transmission paths.

6. The communication device according to claim 4, wherein the circuitry is further configured to:
receive transmission system information from the second external device via the second transmission path; and
receive a control packet from the first external device, based on the transmission system information, wherein the control packet comprises the dynamic range conversion definition information.

7. The communication device according to claim 4, wherein the circuitry is further configured to:
receive meta information of the dynamic range conversion definition information, via a specific line of the second transmission path,
wherein the second external device is compatible with the meta information; and
superimpose the second graphics data on the first image data based on the meta information.

8. The communication device according to claim 7, wherein the specific line of the second transmission path has a pair of differential transmission paths, and
wherein the circuitry is further configured to receive a notification message that indicates the connection status of the second external device from at least one of the pair of differential transmission paths.

9. A communication method, comprising:
in a communication device:
receiving first image data from a first external device via a first transmission path, wherein the first image data is output of a decoding operation in the first external device;
determining a connection status of a second external device with the communication device;
determining whether the second external device supports dynamic range conversion based on the connection status;
receiving dynamic range conversion definition information from the first external device via the first transmission path based on the determination that the second external device supports the dynamic range conversion;
adjusting, based on the dynamic range conversion definition information, a luminance value of first graphics data, to obtain second graphics data;
generating second image data based on superimposition of the second graphics data and the first image data; and
transmitting the second image data to the second external device via a second transmission path.

10. A non-transitory computer-readable medium having stored thereon, computer-executable instructions, which when executed by a computer, cause the computer to execute operations, the operations comprising:
receiving first image data from a first external device via a first transmission path, wherein the first image data is output of a decoding operation in the first external device;
determining a connection status of a second external device with a communication device;
determining whether the second external device supports dynamic range conversion based on the connection status;
receiving dynamic range conversion definition information from the first external device via the first transmission path based on the determination that the second external device supports the dynamic range conversion;
adjusting, based on the dynamic range conversion definition information and an instruction, a luminance value of first graphics data, to obtain second graphics data;
generating second image data based on superimposition the second graphics data and the first image data; and
transmitting the second image data to the second external device via a second transmission path.

* * * * *